(12) United States Patent
Wang et al.

(10) Patent No.: US 10,788,632 B2
(45) Date of Patent: Sep. 29, 2020

(54) DEVICE AND METHOD FOR COUPLING LASER TO A PHOTONIC INTEGRATED CIRCUIT

(71) Applicant: Google LLC, Mountain View, CA (US)

(72) Inventors: Daoyi Wang, San Jose, CA (US); Lieven Verslegers, San Francisco, CA (US); Ryohei Urata, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/261,211

(22) Filed: Jan. 29, 2019

(65) Prior Publication Data
US 2020/0241222 A1     Jul. 30, 2020

(51) Int. Cl.
*G02B 6/42*     (2006.01)

(52) U.S. Cl.
CPC ............ *G02B 6/4214* (2013.01); *G02B 6/42* (2013.01); *G02B 6/4208* (2013.01); *G02B 6/4239* (2013.01); *G02B 6/4244* (2013.01); *G02B 6/4245* (2013.01)

(58) Field of Classification Search
None
See application file for complete search history.

(56) References Cited

U.S. PATENT DOCUMENTS

| | | | |
|---|---|---|---|
| 4,293,826 A * | 10/1981 | Scifres | ................ H01S 5/02252 372/44.01 |
| 4,764,005 A | 8/1988 | Webb et al. | |
| 4,847,492 A | 7/1989 | Houki | |
| 5,070,488 A | 12/1991 | Fukushima et al. | |
| 5,532,873 A | 7/1996 | Dixon | |
| 6,442,110 B1 | 8/2002 | Yamamoto et al. | |
| 6,687,036 B2 | 2/2004 | Riza | |
| 9,692,202 B2 * | 6/2017 | Behfar | .................. H01S 5/0071 |
| 9,971,107 B2 | 5/2018 | Mekis et al. | |
| 10,146,020 B1 * | 12/2018 | Yasumura | .......... G02B 6/29316 |
| 10,162,135 B2 * | 12/2018 | Gamache | ............. G02B 6/4251 |
| 2002/0126402 A1 * | 9/2002 | Memezawa | .......... G02B 6/4246 359/833 |

(Continued)

FOREIGN PATENT DOCUMENTS

| | | |
|---|---|---|
| CN | 106443902 A | 2/2017 |
| WO | 2005040052 A2 | 5/2005 |

OTHER PUBLICATIONS

International Search Report and Written Opinion for International Application No. PCT/US2019/063960 dated Mar. 12, 2020. 16 pages.

*Primary Examiner* — Michelle R Connelly
(74) *Attorney, Agent, or Firm* — Lerner, David, Littenberg, Krumholz & Mentlik, LLP

(57) ABSTRACT

A photonic integrated circuit for coupling a laser from an optical assembly to a grating coupler is disclosed. A method for coupling a laser to a photonic integrated circuit is disclosed. The optical assembly includes an optical system disposed on a v-groove bench. The optical system typically includes a laser source, a coupling lens or lens system, an optional isolator, a beam redirector that includes a prism or other light turning element and a cylindrical tube mounted on the v-groove bench. The method of tuning the angle of incidence from the optical assembly to the grating coupler is also disclosed.

25 Claims, 8 Drawing Sheets

(56) References Cited

U.S. PATENT DOCUMENTS

| | | | |
|---|---|---|---|
| 2004/0240087 A1* | 12/2004 | Matsushima | G02B 6/4204 |
| | | | 359/820 |
| 2005/0058400 A1* | 3/2005 | Fukuoka | G02B 6/3636 |
| | | | 385/49 |
| 2006/0239612 A1* | 10/2006 | De Dobbelaere | G02B 6/42 |
| | | | 385/37 |
| 2006/0251362 A1* | 11/2006 | Uekawa | G02B 6/3636 |
| | | | 385/93 |
| 2010/0006784 A1 | 1/2010 | Mack et al. | |
| 2015/0215046 A1* | 7/2015 | Mekis | G02B 6/4213 |
| | | | 398/200 |
| 2018/0287336 A1* | 10/2018 | Victoria | H01S 5/02276 |
| 2018/0335575 A1* | 11/2018 | Gudeman | G02B 6/3652 |
| 2018/0348455 A1 | 12/2018 | Yasumura et al. | |
| 2019/0212511 A1* | 7/2019 | Mack | G02B 6/34 |

\* cited by examiner

DEVICE AND METHOD FOR COUPLING LASER TO A PHOTONIC INTEGRATED CIRCUIT

BACKGROUND

Optical communications use modulated light beams to transmit information through optical fibers, free space, or waveguides. In advanced optical communication technologies, such as those based on silicon photonics, electronics and optical components can be integrated on the same circuit unit. The integration of components can lead to production of low-cost devices on silicon wafers through standard processes from the microelectronics industry. However, there remains some challenges in the integration in order to unlock the full potential of silicon photonics.

SUMMARY

At least one aspect is directed to a photonic integrated circuit. The photonic integrated circuit includes a grating coupler disposed on a substrate. The photonic integrated circuit also includes an optical assembly for coupling a light signal to the grating coupler. The optical assembly includes an optical system disposed on a v-groove bench. The optical system includes a laser source for generating a light for the light signal and a coupling lens system for receiving the light from the laser source and guiding the light in a first direction. The optical system also includes a beam redirector for redirecting the light from the coupling lens system to a second direction. The second direction is about 90° from the first direction. The beam redirector includes a cylindrical portion and a reflector portion.

In some implementations, the beam redirector is configured for longitudinal movement along the v-groove bench to set a focal point of the redirected light onto a surface plane of the grating coupler. In some implementations, the beam adjuster is configured for rotational movement within the v-groove bench to set an angle of incidence between the second direction and a direction normal to the surface plane of the grating coupler. In some implementations, the cylindrical portion has a diameter between about 0.2 mm to about 5 mm. In some implementations, the cylindrical portion has a diameter of about 0.7 mm. In some implementations, the longitudinal movement is limited to about 0.1 mm.

In some implementations, the reflector portion is a prism and the cylindrical portion is a glass. In some implementations, the reflector portion is a mirror and the cylindrical portion is a hollowed tube. In some implementations, the reflector portion and the cylindrical portion are bonded to one another. In some implementations, the reflector portion is positioned above the grating coupler. In some implementations, one of a half-wave plate or an isolator is attached to one of the beam redirector or the coupling lens system.

At least one aspect is directed to a method of manufacturing a photonic integrated circuit. The method includes providing a grating coupler disposed on a substrate. The method also includes providing an optical assembly for coupling a light signal to the grating coupler. The optical assembly includes a v-groove bench and an optical system disposed on the v-groove bench. The optical system includes a laser source for generating a light for the light signal and a coupling lens system for receiving the light from the laser source and guiding the light in a first direction. The optical system also includes a beam redirector for redirecting the light to a second direction and the second direction is about 90° from the first direction. The beam director also adjusts the path of the redirected light onto a surface plane of the grating coupler via at least one of longitudinal movement or rotational movement of the beam director. In some implementations, the beam redirector can include a cylindrical portion and a reflector portion that are coupled to one another.

In some implementations, the cylindrical portion has a diameter of about 0.7 mm. In some implementations, the reflector portion is a prism and the cylindrical portion includes a glass. In some implementations, the reflector portion is a mirror and the cylindrical portion includes a hollowed tube. In some implementations, the longitudinal movement is limited to about 0.1 mm.

In some implementations, the longitudinal movement of the beam director is along the v-groove bench to set a focal point of the redirected light on the surface plane of the grating coupler. In some implementations, the rotational movement of the beam director is within the v-groove bench to set an angle of incidence between the second direction of the redirected light and a direction normal to the surface plane of the grating coupler.

In some implementations, the method further includes measuring a light coupling efficiency as a function of the one of longitudinal movement or rotational movement of the beam director.

In some implementations, the method further includes bonding the optical system to the v-groove bench. In some implementations, the bonding occurs after the redirected light is set on the surface plane of the grating coupler at an optimum light coupling efficiency.

At least one aspect is directed to an optical assembly for coupling a light signal to a grating coupler. The optical assembly includes a v-groove bench, a grating coupler disposed adjacent to the v-groove bench, and an optical system disposed on the v-groove bench. In some implementations, the optical system includes a laser source for generating a beam of light, a coupling lens system for receiving the beam of light from the laser source and guiding the beam of light in a first direction, and a beam redirector for redirecting the beam of light to a second direction, the second direction of redirected light being about 90° from the first direction.

In some implementations, the coupling lens system and the beam redirector are bonded to the v-groove bench. In some implementations, the beam redirector sets a focal point of the redirected light onto a surface plane of the grating coupler. In some implementations, the beam redirector sets an angle of incidence between the second direction of the redirected light and a direction normal to the surface plane of the grating coupler.

In some implementations, the beam redirector includes a cylindrical portion and a reflector portion that are bonded to one another. In some implementations, the reflector portion is a prism and the cylindrical portion is a glass. In some implementations, the reflector portion is a mirror and the cylindrical portion is a hollowed tube. In some implementations, the reflector portion is suspended beyond an edge of the v-groove bench. In some implementations, the reflector portion is positioned above the grating coupler. In some implementations, one of a half-wave plate or an isolator is attached to one of the beam redirector or the coupling lens system. In some implementations, the beam redirector is bonded in a position along the v-groove bench and in a rotational orientation that provides an optimum optical coupling of light emitted by the laser source into the grating coupler.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1B:
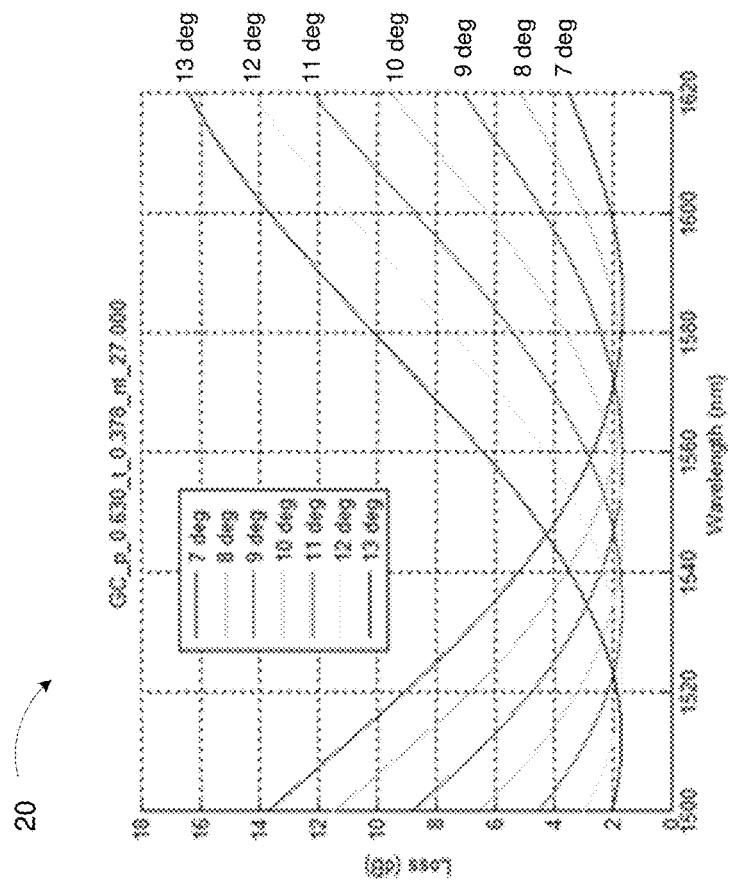
FIG. 1B shows a chart of typical coupling loss characteristics of a grating coupler with respect to wavelength at different angles of incidence.

The disclosure as described herein offers a solution to some of the challenges to unlocking the potential of integrated silicon photonics. The disclosure generally relates to a method and device for coupling a light source to a photonic integrated circuit. The photonic integrated circuit as disclosed herein includes a grating coupler disposed on a substrate and an optical assembly for coupling a light signal to the grating coupler. The optical assembly includes an optical system disposed on a v-groove bench. The optical system can include a laser source for generating a light for the light signal and a coupling lens system for receiving the light from the laser source and for guiding the light to a beam redirector. The beam redirector redirects the light from the coupling lens system onto the grating coupler. The beam redirector can include a cylindrical portion and a reflector portion. In some implementations, the cylindrical portion and the reflector portion are bonded together. The photonic integrated circuit can also include other optical components, such as a beam splitter, a power splitter, a half-wave plate, a quarter-wave plate, isolator, a modulator, and a monitor photodiode.

The substrate used in silicon photonics is silicon. However, as an indirect bandgap semiconductor, silicon is a weak light emitter. In contrast, a direct bandgap semiconductor, such as, those based on III-V materials, offers a more suitable alternative. Since silicon photonics is an up and coming optical technology, there is a need for developing efficient and cost-effective ways to integrate and package a direct-gap III-V laser source with silicon photonics.

Hybrid integration of fully-processed laser sources (chips) allows for a high level of customizability, and can be implemented with silicon photonics via either an edge-coupling or grating-coupling scheme. In the edge-coupling configuration, light is transferred horizontally from an edge-emitting laser source to an edge coupler on the photonic integrated circuit waveguide, directly or through a coupling optics system. Due to the difficulty to achieve a large enough spot size at an edge coupler of a silicon chip, tight sub-micron alignment tolerance is typically required. This tight tolerance makes the III-V laser to photonic integrated circuit alignment difficult. In addition, edge coupling cannot be easily achieved at the wafer-level because it requires chip edge processing, which may lead to higher cost in manufacturing of a photonic integrated circuit based on this technique.

As for integration via the grating-coupling scheme, there are several benefits to using a grating coupler. For example, a grating coupler can allow vertical integration that is compatible with wafer-level testing on a silicon substrate, and offers relatively efficient coupling and relaxed alignment tolerances due to its larger mode field size. However, grating couplers are sensitive to the angle of incidence, wavelength, and state of polarization of the incoming light. Grating couplers include diffractive elements with a limited optical bandwidth over which they can efficiently couple light. Therefore, process variations in the fabrication of the grating coupler can result in variation of the center wavelength from one grating coupler to another. In addition, the angle of incidence of light impinging on the grating coupler also affects the center wavelength; e.g., a steeper angle of incidence may result in a shorter center wavelength. Process variations in the assembly can also affect the angle of incidence of light on the grating coupler. Such process variations can include, for example and without limitation, position of the light source, coupling lens, mirror, and grating coupler, etc.

Figure 1A:
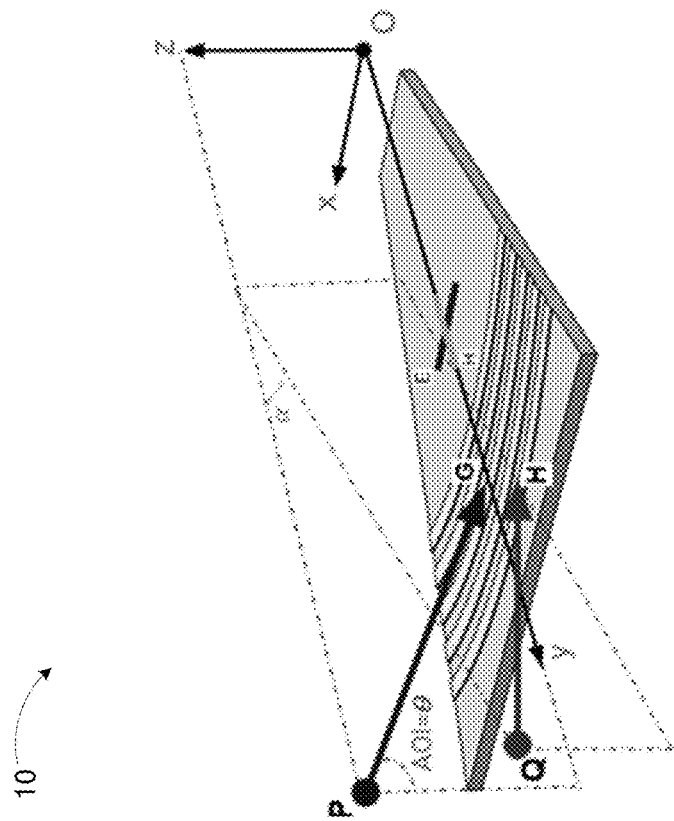
FIG. 1A shows a perspective view of a grating coupler with respect to the direction of incoming light, according to an illustrative implementation.

FIG. 1A shows a perspective view of a grating coupler 10 in a 3-D Cartesian coordinate system with axes of x, y, and z, according to an illustrative implementation. The grating coupler 10 is designed for use, for example, in the y/z plane. The incoming light is directed within the y/z plane, and has a vertical angle of incidence (AOI) θ with respect to the z axis, which is perpendicular to the surface of the grating coupler 10.

FIG. 1B shows a chart 20 of typical coupling loss characteristics of a grating coupler with respect to wavelength at different angles of incidence. For a fixed laser wavelength, a change in angle of incidence can lead to an increase in coupling loss, i.e., a reduction in coupling efficiency. For example, at 1550 nm, a change of angle of incidence from 10° to 12° causes about an extra 1 dB of coupling loss.

In addition, most grating coupler designs are not radially symmetrical. If the incidence beam has an angle with respect to the design principal plane (angle α with respect to the y/z plane as shown in FIG. 1A), excessive loss will incur.

Additionally, 1-D grating couplers are also polarization sensitive. If the state of polarization of the incoming light is not aligned with the grating polarization, the light of the orthogonal polarization does not couple efficiently into the grating coupler, i.e., the grating coupler acts as a polarizer. Therefore, the angle of incidence, the wavelength and state of polarization of the incoming light with respect to the orientation of the grating coupler requires careful alignment and placement. As a result, passive alignment or placement of coupling components with respect to the orientation of the grating coupler can lead to reduced coupling efficiency. Moreover, the penalty from poor alignment during the fabrication, the assembly, or the bonding of the coupling components may also reduce coupling efficiency. Therefore, active placement and controlled alignment of the coupling components are needed to ensure an optimum coupling efficiency in an integrated photonics circuit.

The systems described herein rely on active placement accuracy and controlled alignment to couple the laser light from a III-V laser source to a grating coupler. This can lead to a more efficient device with low coupling losses and improved polarization alignments. Specifically, the method and device disclosed herein benefit from an active fine-tuning of the incidence beam onto the grating coupler via adjustments in the incoming angle of incidence and modification of the laser path length using a single component, such as a beam redirector as described below. This allows for a simpler fabrication process that can reduce the overall cost in manufacturing of the photonic integrated circuit while offering wider tolerances for optimization in light coupling efficiency. Various implementations of integrated silicon photonic systems are described in further detail below.

Figure 2:
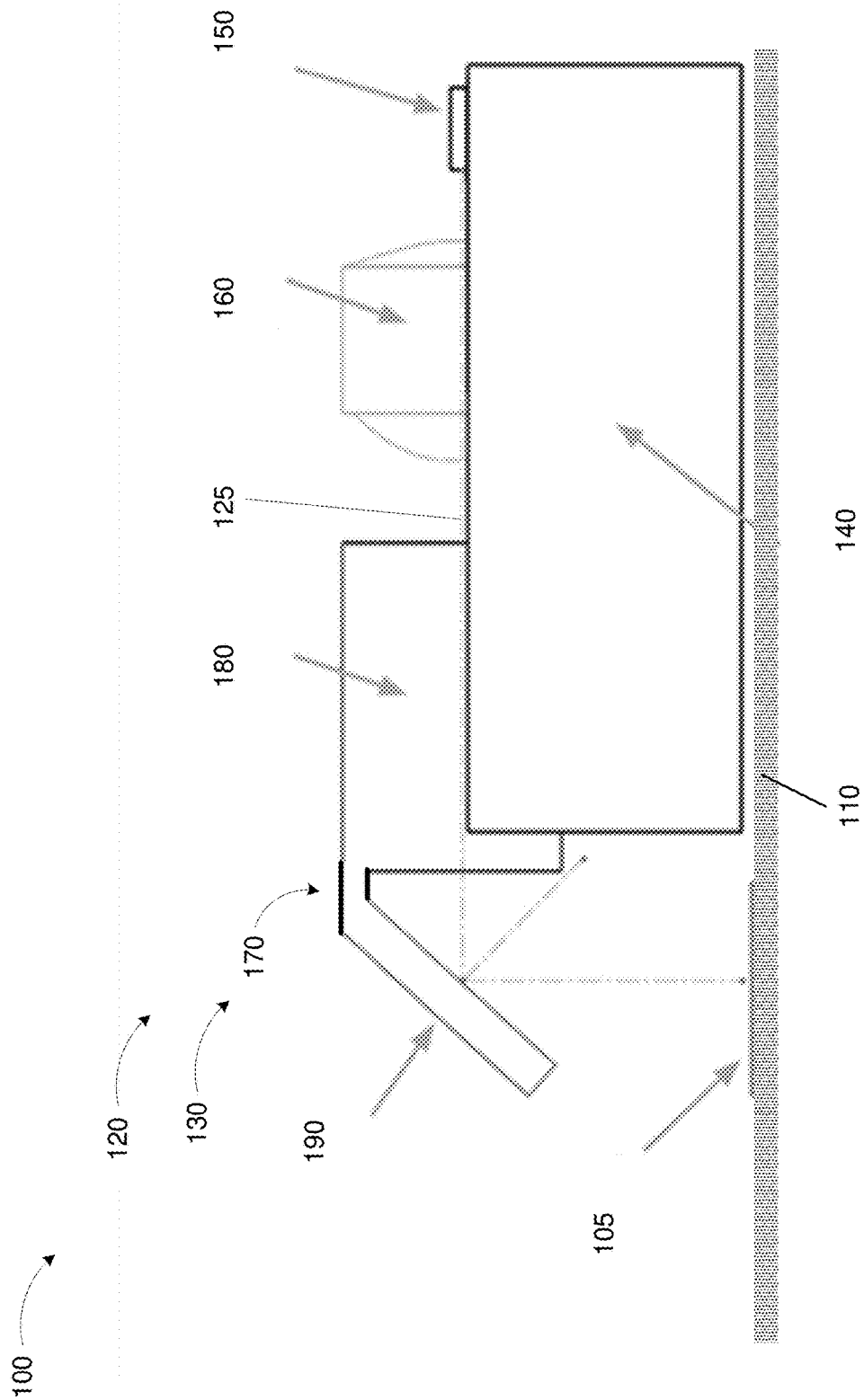
FIG. 2 is a cross-sectional view of a photonic integrated circuit, according to an illustrative implementation.

FIG. 2 is a cross-sectional view of a photonic integrated circuit 100, according to an illustrative implementation. The photonic integrated circuit 100 includes a grating coupler 105 disposed on a substrate 110. The photonic integrated circuit 100 also includes an optical assembly 120 for coupling a light signal 125 to the grating coupler 105. The optical assembly 120 includes an optical system 130 disposed on a v-groove bench 140. The optical system 130 includes a laser source 150 for generating a light for the light signal 125 and a coupling lens system 160 for receiving the light from the laser source 150, and guiding and focusing the light in a first direction. The optical system 120 also includes a beam redirector 170 for redirecting the light from the coupling lens system 160 to a second direction towards the grating coupler 105. The beam redirector 170 further includes a cylindrical portion 180 and a reflector portion 190. The reflector portion 190 redirects the light in the second direction, which is about 90° from the first direction.

In some implementations, the grating coupler 105 is disposed on the substrate 110. In some implementations, the grating coupler 105 is embedded in the substrate 110. In some implementations, the grating coupler 105 is fabricated within the substrate 110. In some implementations, the grating coupler 105 has a leveled surface flushed with the surface of the substrate 110. In some implementations, the substrate 110 can be a silicon substrate, silicon-on-insulator substrate, silicon nitride coated silicon substrate, silicon oxide coated silicon substrate. Similarly, the v-groove bench 140 can be silicon or any other suitable material.

In some implementations, the laser source 150 produces a continuous-wave beam of light for the light signal 125 with a narrow bandwidth. In some implementations, the laser source 150 can be a laser diode in die form. In some implementations, the diode die can be mounted p-side down. In some implementations, the diode die can be mounted p-side up. The laser source 150 can be soldered to electrical contacts or pads on the surface of the v-groove bench 140 or to a driver via wire bonds. In some implementations, the laser source 150 can be packaged in a standalone die form, which is then mounted adjacent to the v-groove bench 140. In some implementations, the light from an independently mounted laser source 150 can be manipulated in order to properly guide the light from the laser source 150 to the coupling lens system 160.

In some implementations, the coupling lens system 160 can include a lens or a lens assembly containing more than one optical element for focusing the light onto the grating coupler 105, either directly or indirectly (via one or more reflections). In some implementations, the coupling lens system 160 can be mounted in the v-groove bench 140, and optionally bonded using a glue or an epoxy. In some implementations, the coupling lens system 160 can be mounted on an optics mount via one or more brackets or mounts, and then the optics mount containing the coupling lens system 160 is disposed in the v-groove bench 140.

The beam redirector 170 includes a cylindrical portion 180 and a reflector portion 190. In some implementations, the beam redirector 170 is disposed in the v-groove bench 140. In some implementations, the cylindrical portion 180 is disposed in the v-groove bench 140 while the reflector portion 190 is not disposed in the v-groove bench 140.

In some implementations, the cylindrical portion 180 has a diameter between about 0.2 mm to about 5 mm, inclusive of any diameters therebetween. In some implementations, the cylindrical portion 180 has a diameter between about 0.5 mm to about 4.5 mm, about 0.5 mm to about 4 mm, about 0.5 mm to about 3.5 mm, about 0.5 mm to about 3 mm, about 0.5 mm to about 2.5 mm, about 0.5 mm to about 2.0 mm, about 0.5 mm to about 1.5 mm, about 0.5 mm to about 1.0 mm, or about 0.5 mm to about 0.8 mm, inclusive of any diameter therebetween.

In some implementations, the cylindrical portion 180 has a diameter of about 5 mm, about 4.5 mm, about 4 mm, about 3.5 mm, about 3 mm, about 2.5 mm, about 2 mm, about 1.5 mm, about 1 mm, about 0.9 mm, about 0.8 mm, about 0.7 mm, about 0.6 mm, about 0.5 mm, about 0.4 mm, about 0.3 mm, or about 0.2 mm.

In some implementations, the cylindrical portion 180 has a length between about 1 mm to about 15 mm, inclusive of any lengths therebetween. In some implementations, the cylindrical portion 180 has a length between about 1 mm to about 12 mm, about 1 mm to about 10 mm, about 1 mm to about 8 mm, about 1 mm to about 6 mm, about 1 mm to about 5 mm, about 1 mm to about 4.5 mm, about 1 mm to about 4 mm, about 1 mm to about 3.5 mm, about 1 mm to about 3 mm, about 1 mm to about 2.5 mm, about 1 mm to about 2 mm, about 1.5 mm to about 12 mm, about 1.5 mm to about 10 mm, about 1.5 mm to about 8 mm, about 1.5 mm to about 6 mm, about 1.5 mm to about 5 mm, about 1.5 mm to about 4.5 mm, about 1.5 mm to about 4 mm, about 1.5 mm to about 3.5 mm, about 1.5 mm to about 3 mm, about 1.5 mm to about 2.5 mm, or about 1.5 mm to about 2 mm, inclusive of any length therebetween.

In some implementations, the cylindrical portion 180 has a length of about 15 mm, about 14 mm, about 13 mm, about 12 mm, about 11 mm, about 10 mm, about 9 mm, about 8 mm, about 7 mm, about 6 mm, about 5 mm, about 4.5 mm, about 4 mm, about 3.5 mm, about 3 mm, about 2.5 mm, about 2 mm, about 1.5 mm, or about 1 mm.

In some implementations, the cylindrical portion 180 is an optically transparent tube, such as a glass. In some implementations, the cylindrical portion 180 is a hollow tube. In some implementations, the reflector portion 190 is a prism. In some implementations, the reflector portion 190 is a mirror. In some implementations, the cylindrical portion 180 and the reflector portion 190 are coupled to one another. In some implementations, the cylindrical portion 180 and the reflector portion 190 are bonded to one another using an epoxy or any other suitable bonding material. In some implementations, the cylindrical portion 180 and the reflector portion 190 are attached to one another via a mechanical fixture.

In the optical system 130, the laser source 150 generates a light for the light signal 125. The coupling lens system 160 receives the light from the laser source 150 and guides the light in a first direction. The beam redirector 170 redirects the light from the coupling lens system 160 to a second direction towards the grating coupler 105. In some implementations, the reflector portion 190 redirects the light in the second direction, which is about 90° from the first direction.

Although not explicitly shown in FIG. 2, the photonic integrated circuit 100 may include other optical components, such as, but not limited to a beam splitter, a power splitter, a half-wave plate, a quarter-wave plate, an isolator, a modulator, a monitor photodiode, or any other suitable optical components. In some implementations, optical components, such as a wave plate that converts TM polarization to TE polarization, or vice versa, can be included the photonic integrated circuit 100. In some implementations, one or more of these optical components may be placed anywhere along the path of the light signal 125 between the laser source 150 and the grating coupler 105. In some implementations, one or more of these optical components can be attached to the laser source 150. In some implementations, one or more of these optical components can be placed between the laser source 150 and the coupling lens system 160. In some implementations, one or more of these optical components can be attached to the coupling lens system 160. In some implementations, one or more of these optical components can be placed within the coupling lens system 160 if the coupling lens system 160 includes more than one lens or optical element. In some implementations, one or more of these optical components can be placed between the coupling lens system 160 and the beam redirector 170. In some implementations, one or more of these optical components can be placed between the cylindrical portion 180 and the reflector portion 190 of the beam redirector 170. In some implementations, one or more of these optical components can be attached to the cylindrical portion 180. In some implementations, one or more of these optical components can be attached to the reflector portion 190. In some implementations, one or more of these optical components can be placed between the beam redirector 170 and the grating coupler 105. In some implementations, one or more of these optical components can be placed above the grating coupler 105.

Figure 3A:
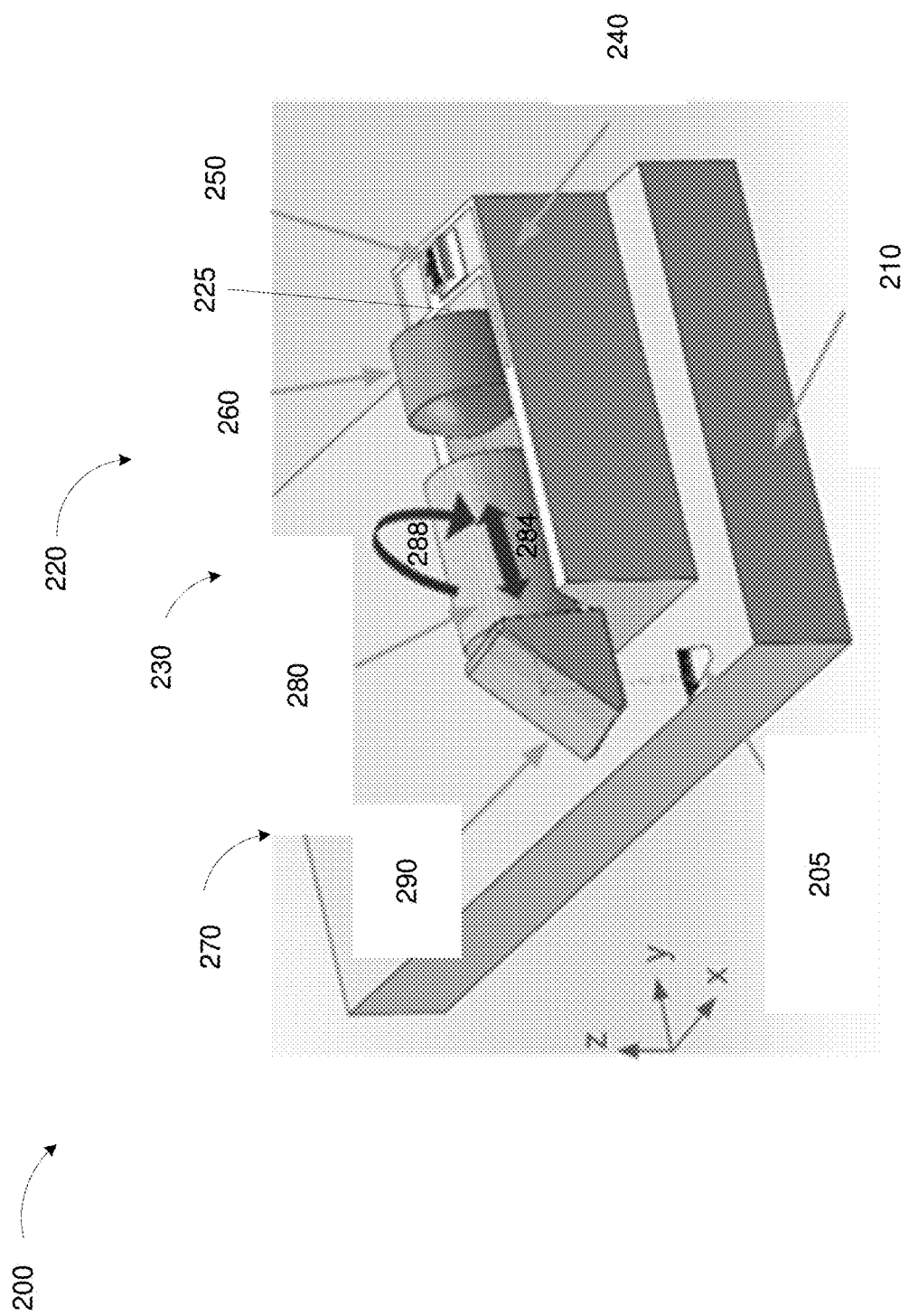
FIG. 3A is a perspective view of an alternative embodiment of a photonic integrated circuit, according to an illustrative implementation.

FIG. 3A is a perspective view of alternative embodiment of a photonic integrated circuit 200, according to an illustrative implementation. The photonic integrated circuit 200 includes a grating coupler 205 fabricated within or coupled to a substrate 210. The photonic integrated circuit 200 also includes an optical assembly 220 for coupling a light signal 225 to the grating coupler 205. The optical assembly 220 includes an optical system 230 disposed on a v-groove bench 240. The v-groove bench 240 is mounted on the substrate 210. The optical system 230 includes a laser source 250, a coupling lens system 260, and a beam redirector 270, each disposed on the v-groove bench 240. The beam redirector 270 further includes a cylindrical portion 280 and a reflector portion 290. In some implementations, the cylindrical portion 280 is made from a glass. In some implementations, the cylindrical portion 280 can be a hollow tube. In some implementations, the reflector portion 290 is a prism. As shown in FIG. 2B, the cylindrical portion 280 and the reflector portion 290 are bonded to one another.

Within the optical system 230, the laser source 250 generates a light for the light signal 225. The coupling lens system 260 receives the light from the laser source 250 and guides the light in a first direction. The beam redirector 270 redirects the light from the coupling lens system 260 to a second direction towards the grating coupler 205. In some implementations, the cylindrical portion 280 receives the light from the coupling lens system 260, and the reflector portion 290 redirects the light in the second direction, which is about 90° from the first direction.

In some implementations, the beam redirector 270, which includes the cylindrical portion 280 and the reflector portion 290 that are bonded together, is disposed in the v-groove bench 240. In some implementations, the cylindrical portion 280 of the beam redirector 270 is in contact with the v-groove bench 240 in a tangent manner while the reflector portion 290 is suspended or floating beyond the edge of the v-groove bench 240 as shown in FIG. 2B. One prism surface of the reflector portion 290 is attached to the cylindrical portion 280 and the other prism surface is directly above the grating coupler 205.

In some implementations, the beam redirector 270 can be moved longitudinally (longitudinal movement) along the length of the v-groove bench 240, i.e., in the direction 284. In some implementations, the beam redirector 270 can be moved longitudinally between about 0.02 mm to about 0.5 mm, inclusive of any distance values therebetween. In some implementations, the beam redirector 270 can be moved longitudinally between about 0.05 mm to about 0.4 mm, about 0.05 mm to about 0.3 mm, about 0.05 mm to about 0.2 mm, about 0.05 mm to about 0.1 mm, or about 0.05 mm to about 0.08 mm, inclusive of any distance values therebetween. In some implementations, the beam redirector 270 can be moved longitudinally about 0.5 mm or less, about 0.4 mm or less, about 0.3 mm or less, about 0.2 mm or less, about 0.1 mm or less, about 0.09 mm or less, about 0.08 mm or less, about 0.07 mm or less, about 0.06 mm or less, or about 0.05 mm or less.

In some implementations, the beam redirector 270 can be rotated axially in the direction 288 within the v-groove bench 240. In some implementations, the beam redirector 270 can be rotated by about +/−10°, about +/−8°, about +/−6°, about +/−4°, or about +/−2°. Since the cylindrical portion 280 is attached to the reflector portion 290, moving and/or rotating the cylindrical portion 280 in the v-groove bench 240 cause appropriate movements and/or rotations of the reflector portion 290.

Figure 3B:
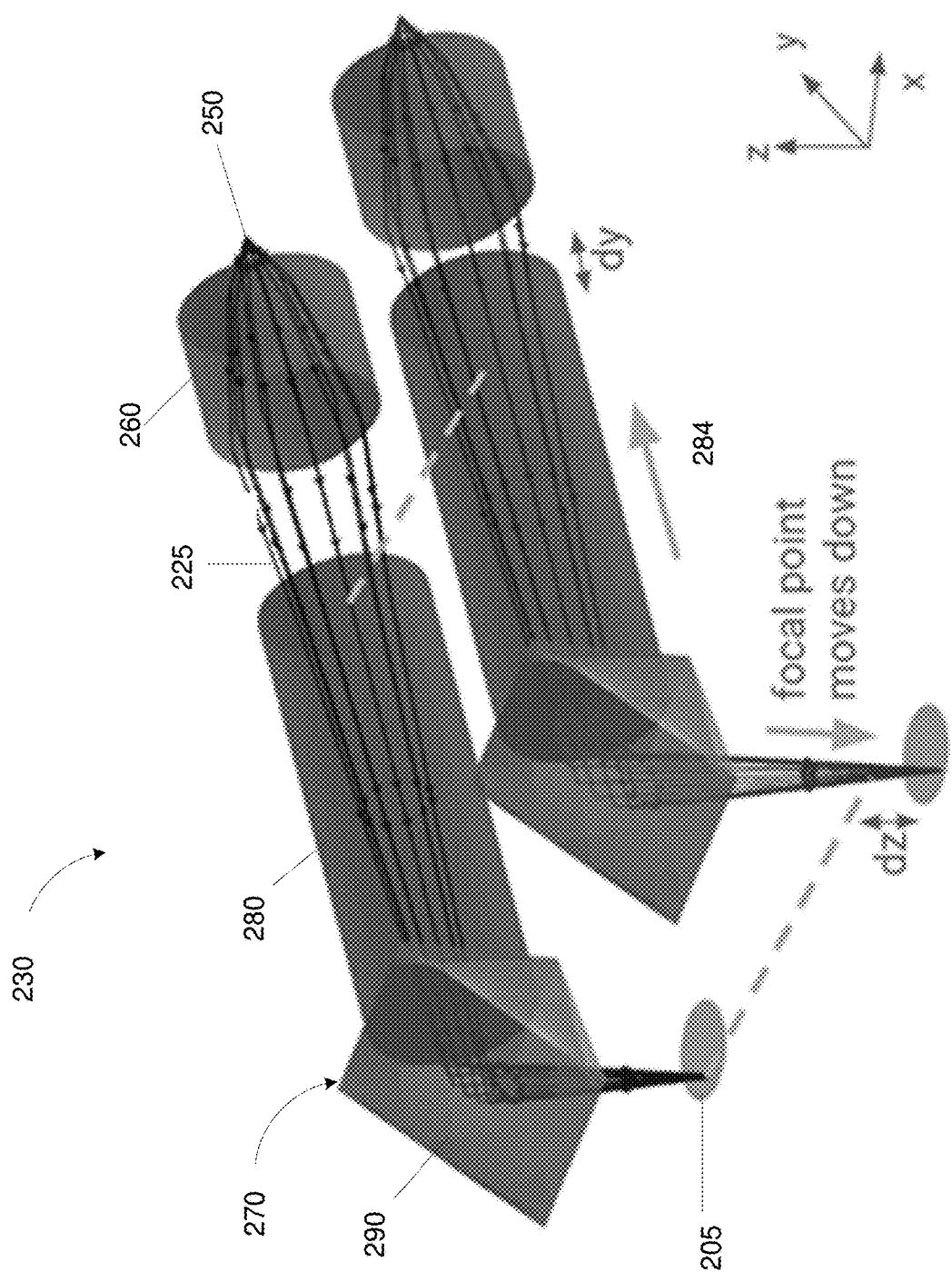
FIG. 3B illustrates an adjustment of a focal point of a light via a longitudinal movement of a beam redirector, according to an illustrative implementation.

FIG. 3B illustrates an adjustment of a focal point of the light via a longitudinal movement of the beam redirector 270 in the optical system 230, according to illustrative implementations. FIG. 3B shows the original position of the optical system 230, which may have an out of focus beam of light 225 impinging on the grating coupler 205. In order to properly focus the beam of light 225 onto the grating coupler 205 for improved, and in some cases, optimum coupling efficiency, the beam redirector 270 can be moved along the y-direction (direction 284) towards or away from the coupling lens system 260, as shown in FIG. 3B. Moving the beam director 270 by a "dy" amount in the y-direction results in the focal point of the beam of light 225 changing by an equal magnitude of a "dz" amount in the z-direction, i.e., towards the surface of the grating coupler 205. Similarly, moving the beam director 270 by a "dy" amount in the negative y-direction (away from the coupling lens system 260) would result in the focal point of the beam of light 225 changing by an equal magnitude of a "dz" amount in the negative z-direction, i.e., away from the surface of the grating coupler 205.

Figure 3C:
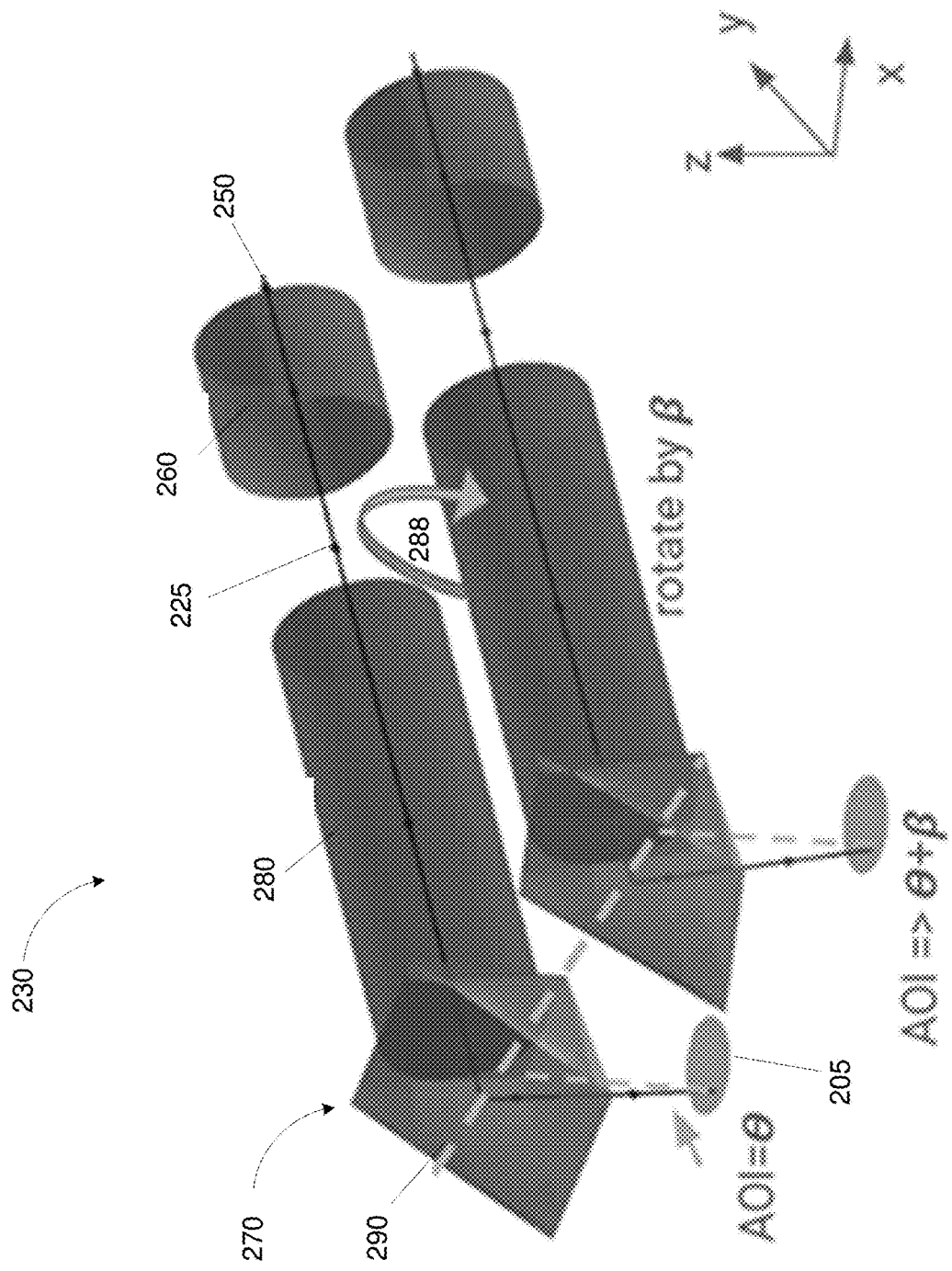
FIG. 3C illustrates an adjustment of an angle of incidence of a light via a rotational movement of a beam redirector, according to an illustrative implementation.

FIG. 3C illustrates an adjustment of an angle of incidence of the light via a rotational movement of the beam redirector 270 in an optical system 230, according to illustrative implementations. FIG. 3C shows the original position of the optical system 230 which may have the beam of light 225 impinging on the grating coupler 205 at an angle of incidence θ. In order to adjust the beam of light 225 onto the grating coupler 205 for an improved or optimum angle of incidence θ to achieve an improved or optimum coupling efficiency, the beam redirector 270 can be rotated in a direction 288 (clockwise around the y-axis) as shown in FIG. 3C. Rotating the beam redirector 270 by a "β" in the direction 288 results in the change in the angle of incidence θ by an equal magnitude of a "β", resulting in the final angle of incidence of (θ+β) on the surface of the grating coupler 205. This is further explained below in mathematical equations. Similarly, rotating the beam redirector 270 counterclockwise (i.e., β<0) results in an opposite change in the angle of incidence θ.

For the angle of incidence θ, the beam of light 225 to the grating coupler 205 is denoted as:

$$\vec{r_1} = \begin{bmatrix} \sin\theta \\ 0 \\ \cos\theta \end{bmatrix},$$

where $\vec{r_1}$ is a vector of the beam of light 225. After rotation around the y-axis by an angle of β, the rotation matrix $R_y$ is expressed as:

$$Ry(\beta) = \begin{bmatrix} \cos\beta & 0 & \sin\beta \\ 0 & 1 & 0 \\ -\sin\beta & 0 & \cos\beta \end{bmatrix},$$

then the resultant chief ray $\vec{r_2}$ is:

$$\vec{r_2} = Ry(\beta) \cdot \vec{r_1} = \begin{bmatrix} \sin(\theta+\beta) \\ 0 \\ \cos(\theta+\beta) \end{bmatrix}.$$

As a result, the angle of incidence of the beam of light 225 is changed from θ to (θ+β) after the rotation. The change in the angle of incidence is 1:1 proportional to the rotation angle β. This demonstrates the disclosed method is able to effectively tune the angle of incidence of the grating coupler 205. It is noted that the beam of light 225 is still within the principal plane x/z after the beam redirector 270 is rotated. In addition, the rotation in the angle of incidence θ causes a change in the location of the focal point since the focal point is also slightly moved as the path of the beam of light 225 changes.

Figure 4A:
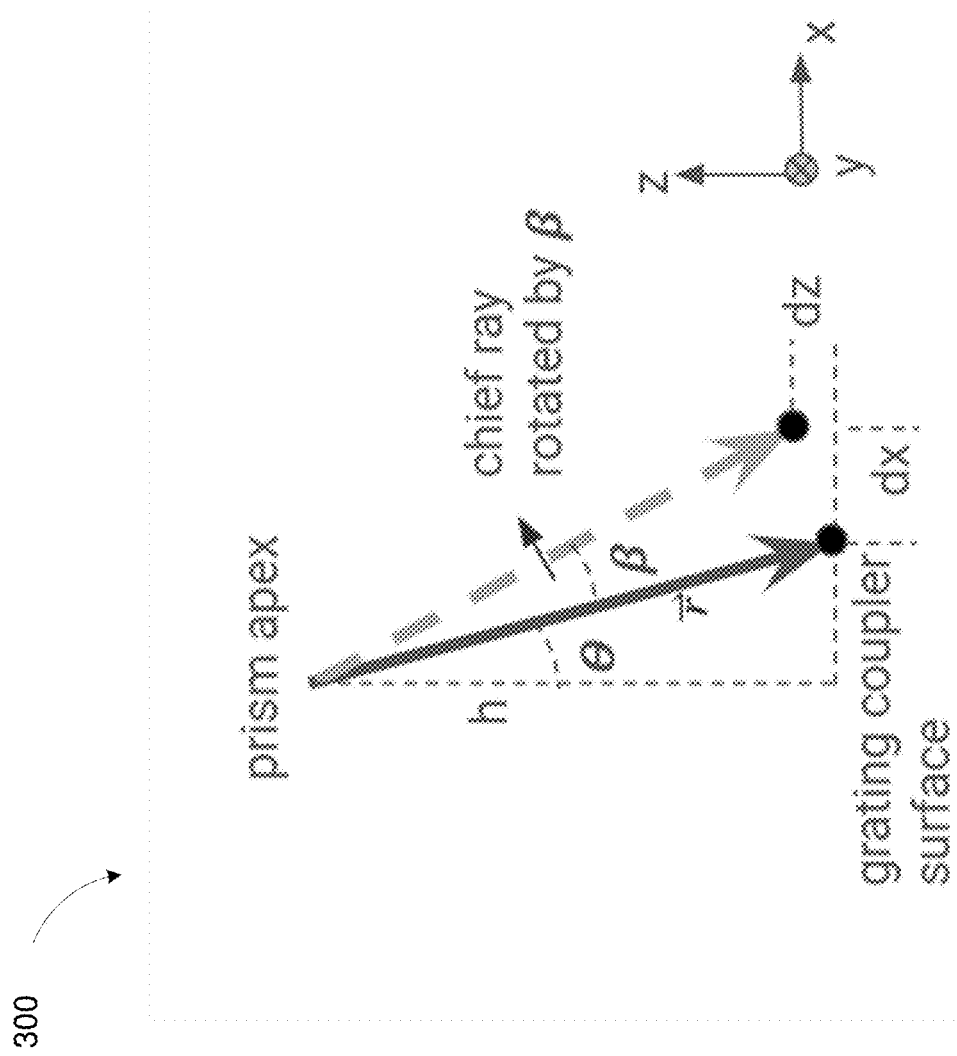
FIG. 4A is an illustration of a change in a focal point of a light as a function of a rotational movement of a beam redirector.
Figures 4B, 4C:
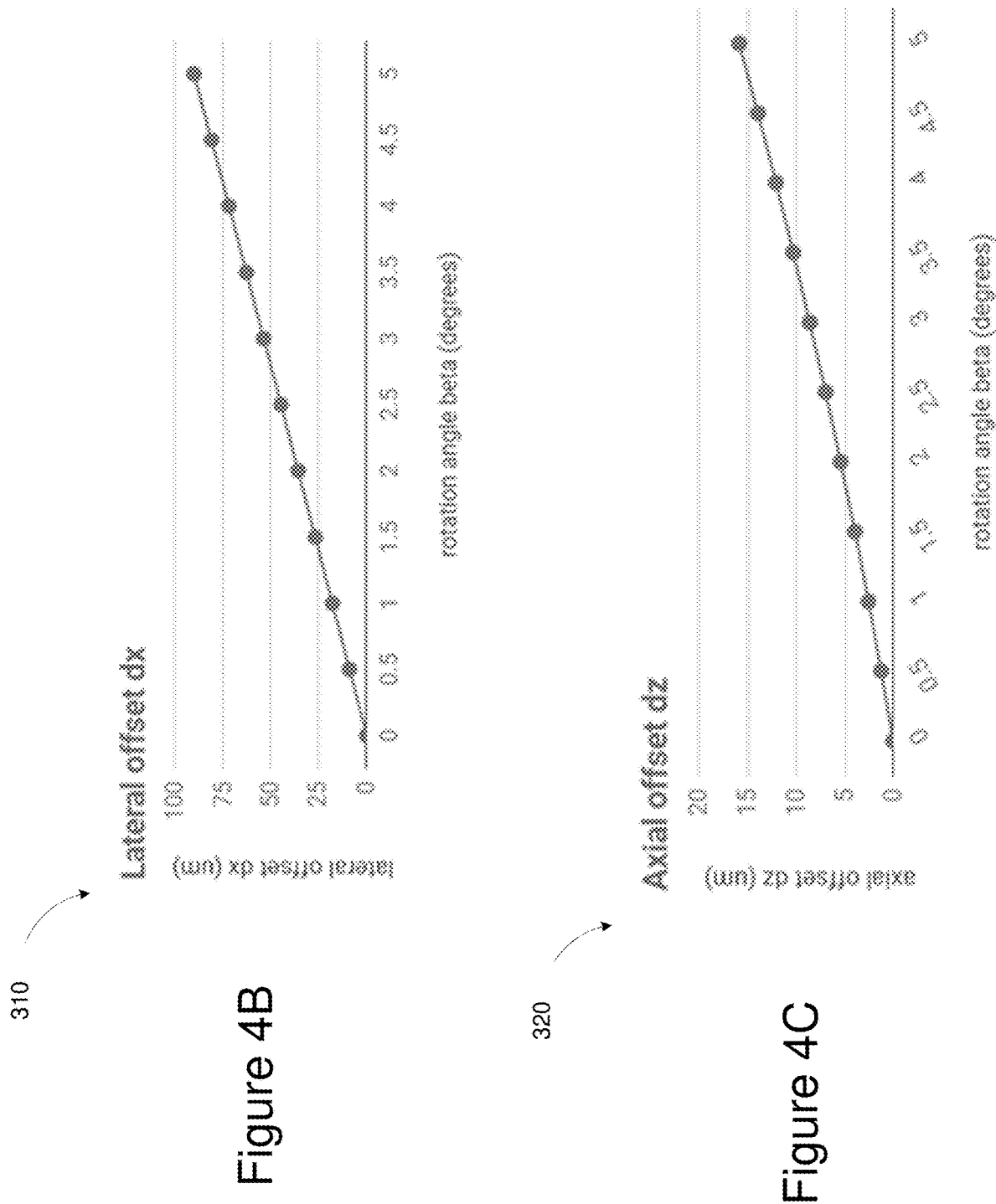
FIG. 4B shows a chart of a lateral offset as a function of a rotational angle of a beam director.
FIG. 4C shows a chart of an axial offset as a function of a rotational angle of a beam director.

FIG. 4A is an illustration 300 that shows a change in a focal point of the light as a function of the rotational movement of the beam redirector 270. The correlation between the movement of the focal point (dx and dz) and the rotation in the angle of incidence (θ to (θ+β)) can be expressed as: dx=h[tan(θ+β)−tan θ] and dz=h[cos θ−cos(θ+β)]. Using these relationships, dx and dz values can be determined from known θ, β, $\vec{r_1}$, $R_y$, and $\vec{r_1}$. FIGS. 4B and 4C show some example values obtained via the aforementioned mathematical relationships.

FIG. 4B shows a chart 310 of a lateral offset as a function of a rotational angle of the beam redirector 270. The calculated numerical values plotted in the chart 310 are verified via experimental measurements. For example, an angle of incidence change from 8° to 13°, i.e., for the β of 5°, the lateral offset dx (i.e., focal point shift) is measured to be about 90 μm, and for β of 1.5°, dx is about 25 μm.

FIG. 4C similarly shows a chart 320 of an axial offset as a function of a rotational angle of the beam redirector 270. For example, for an angle of incidence change from 8° to 13°, i.e., for the β of 5°, the axial offset dz is about 16 μm, and for β of 1.5°, dz is about 4 μm. In some implementations, dx and dz values can be used to determine β and/or θ.

Figure 5:
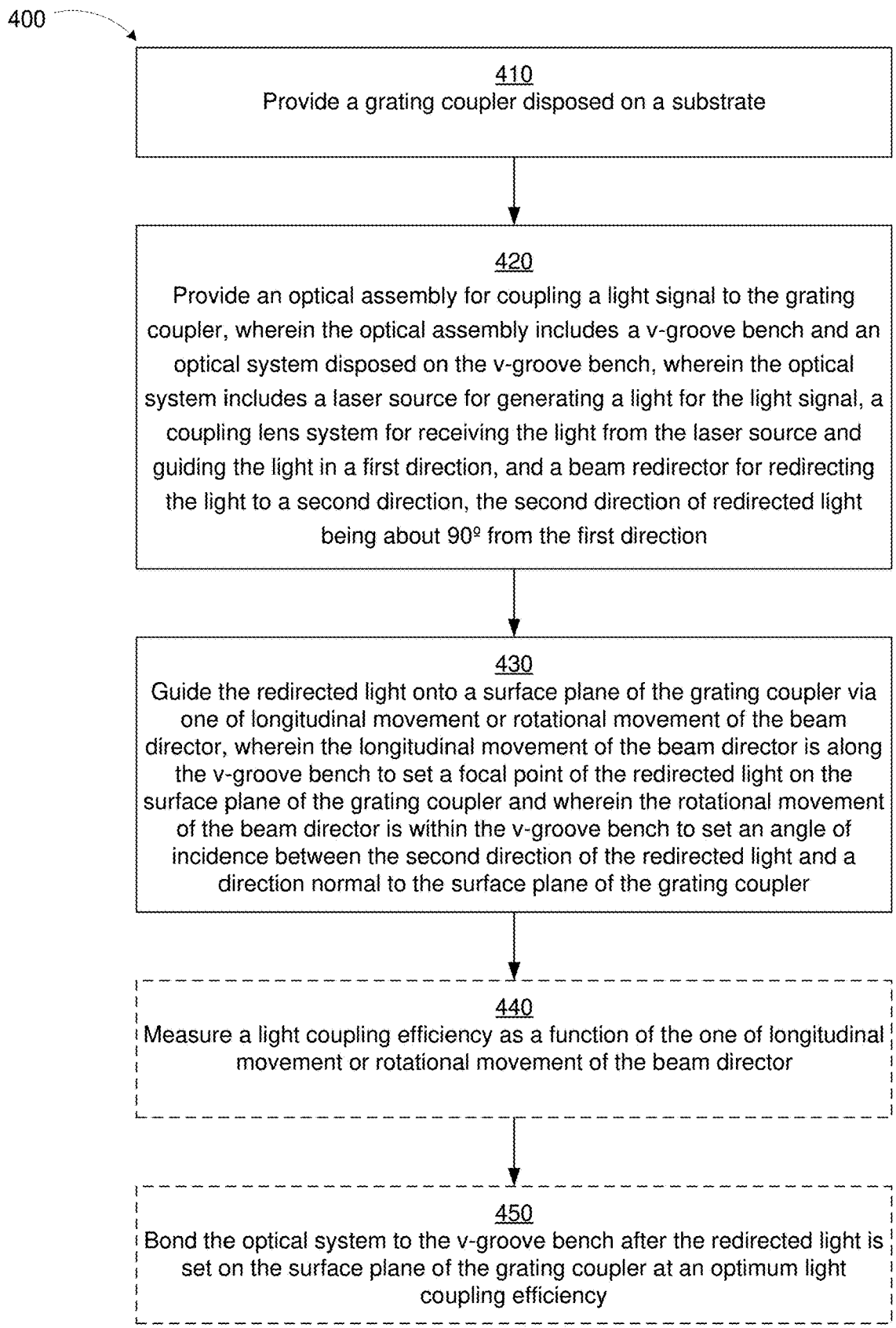
FIG. 5 is a flowchart of an example method of manufacturing a photonic integrated circuit, according to an illustrative implementation.

FIG. 5 is a flowchart of an example method 400 of manufacturing a photonic integrated circuit, according to an illustrative implementation. The method 400 includes providing a grating coupler disposed on a substrate (stage 410). The method 400 also includes providing an optical assembly for coupling a light signal to the grating coupler (stage 420). The method 400 further includes adjusting the light onto a surface plane of the grating coupler (stage 430). In some implementations, the method 400 optionally includes measuring a light coupling efficiency of the grating coupler (stage 440). In addition, the method 400 optionally includes bonding an optical system to a v-groove bench in the optical assembly (stage 450). All the components described below in the method 400 are similar to those included in the photonic integrated circuits described with respect to FIGS. 2 and 3A, and therefore, will not be provided in further detail.

The method 400 includes providing a grating coupler disposed on a substrate (stage 410). The grating coupler can be similar to the grating couplers 105 or 205 as described with respect to FIGS. 2 and 3A. The substrate can be similar to the substrate 110, and therefore the substrate can be a silicon substrate, silicon-on-insulator substrate, silicon nitride coated silicon substrate, silicon oxide coated silicon substrate, or any other suitable substrate.

The method 400 also includes providing an optical assembly for coupling a light signal to the grating coupler (stage 420). The optical assembly can include a v-groove bench and an optical system disposed on the v-groove bench. The optical system can include a laser source for generating a light for the light signal, a coupling lens system for receiving the light from the laser source and guiding the light in a first direction, and a beam redirector for redirecting the light to a second direction. The second direction of redirected light is about 90° from the first direction. The beam redirector can include a cylindrical portion and a reflector portion. The cylindrical portion and the reflector portion can be coupled to one another. All the components described with respect to the optical assembly, the optical system and the v-groove bench in the method 400 are similar to those included in the photonic integrated circuits described with respect to FIGS. 2 and 3A, and therefore, will not be provided in further detail.

The method 400 further includes adjusting or guiding the redirected light onto a surface plane of the grating coupler (stage 430). The adjusting or guiding the redirected light onto the surface plane of the grating coupler can be done via one of longitudinal movement or rotational movement of the beam director. The longitudinal movement of the beam director is along the v-groove bench to set a focal point of the redirected light on the surface plane of the grating coupler. In some implementations, the beam redirector can be moved longitudinally (longitudinal movement) in the v-groove bench. In some implementations, the beam redirector can be moved longitudinally a distance between about 0.02 mm to about 0.5 mm, inclusive of any distance values therebetween. In some implementations, the beam redirector 270 can be moved longitudinally between about 0.05 mm to about 0.4 mm, about 0.05 mm to about 0.3 mm, about 0.05 mm to about 0.2 mm, about 0.05 mm to about 0.1 mm, or about 0.05 mm to about 0.08 mm, inclusive of any distance values therebetween.

The rotational movement of the beam director is within the v-groove bench to set an angle of incidence between the second direction of the redirected light and a direction normal to the surface plane of the grating coupler. In some implementations, the beam redirector can be rotated axially within the v-groove bench along its axis of the cylindrical portion. In some implementations, the beam redirector can be rotated by about +/−10°, about +/−8°, about +/−6°, about +/−4°, or about +/−2° or any degree of rotation included within any of the above ranges.

In some implementations, the longitudinal movement and/or rotational movement of the beam director can be facilitated mechanically via manual stages or a robotic arm, or electromechanically via an electromechanically-actuated robotic arm.

The method 400 optionally includes measuring a light coupling efficiency as a function of one of longitudinal movement or rotational movement of the beam director (stage 440). The light coupling efficiency measurements obtained in stage 440 can help determine the optimum angle of incidence of the redirected light with respect to the normal axis of the surface of the grating coupler. Note that the measurement results for the optimum angle of incidence can depend on the wavelength of light. In other words, the optimum angle of incidence can vary as with the wavelength of the light being used in the integrated photonic system.

The method 400 also optionally includes bonding the optical system to the v-groove bench after the redirected light is set on the surface plane of the grating coupler at an optimum light coupling efficiency (stage 450). Once the optimum angle of incidence is determined via measurements in stage 440, the components in the optical assembly can be bonded to the v-groove bench in the determined position and orientation. The bonding can be done using an epoxy or any other suitable bonding material.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A photonic integrated chip comprising:
    a grating coupler disposed on a substrate; and
    an optical assembly for coupling a light signal to the grating coupler, the optical assembly comprising:
        a v-groove bench, and
        an optical system disposed on the v-groove bench, the optical system comprising:
            a laser source for generating a light for the light signal,
            a coupling lens system for receiving the light from the laser source and guiding the light in a first direction, and
            a beam redirector for redirecting the light to a second direction, the second direction of redirected light being about 90° from the first direction,
                wherein the beans redirector comprises a cylindrical portion and a reflector portion,
                wherein the beam redirector is configured for longitudinal movement along the v-groove bench to set a focal point of the redirected light onto a surface plane of the grating coupler, and
                wherein the beam adjuster is configured for rotational movement within the v-groove bench to set an angle of incidence between the second direction of the redirected light and a direction normal to the surface plane of the grating coupler.

2. The photonic integrated chip according to claim 1, wherein the cylindrical portion has a diameter between about 0.2 mm to about 5 mm.

3. The photonic integrated chip according to claim 1, wherein the cylindrical portion has a diameter of about 0.7 mm.

4. The photonic integrated chip according to claim 1, wherein the longitudinal movement is limited to about 0.1 mm.

5. The photonic integrated chip according to claim 1, wherein the reflector portion is a prism and the cylindrical portion is a glass.

6. The photonic integrated chip according to claim 1, wherein the reflector portion is a mirror and the cylindrical portion is a hollowed tube.

7. The photonic integrated chip according to claim 1, wherein the reflector portion and the cylindrical portion are bonded to one another.

8. The photonic integrated chip according to claim 1, wherein the reflector portion is positioned above the grating coupler.

9. The photonic integrated chip according to claim 1, wherein one of a half-wave plate or an isolator is attached to one of the beam redirector or the coupling lens system.

10. A method of manufacturing a photonic integrated circuit comprising:
   providing a grating coupler disposed on a substrate;
   providing an optical assembly for coupling a light signal to the grating coupler, the optical assembly comprising:
      a v-groove bench, and
      an optical system disposed on the v-groove bench, the optical system comprising:
         a laser source for generating a light for the light signal,
         a coupling lens system for receiving the light from the laser source and guiding the light in a first direction, and
         a beam redirector for redirecting the light to a second direction, the second direction of redirected light being about 90° from the first direction; and
   adjusting the path of the redirected light onto a surface plane of the grating coupler via at least one of longitudinal movement or rotational movement of the beam director.

11. The method of manufacturing according to claim 10, wherein the beam redirector comprises a cylindrical portion and a reflector portion that are coupled to one another.

12. The method of manufacturing according to claim 11, wherein the cylindrical portion has a diameter of about 0.7 mm.

13. The method of manufacturing according to claim 11, wherein the reflector portion is a prism and the cylindrical portion comprises a glass.

14. The method of manufacturing according to claim 11, wherein the reflector portion is a mirror and the cylindrical portion comprises a hollowed tube.

15. The method of manufacturing according to claim 10, wherein the longitudinal movement of the beam director is along the v-groove bench to set a focal point of the redirected light on the surface plane of the grating coupler and wherein the rotational movement of the beam director is within the v-groove bench to set an angle of incidence between the second direction of the redirected light and a direction normal to the surface plane of the grating coupler.

16. The method of manufacturing according to claim 15, wherein the longitudinal movement is limited to about 0.1 mm.

17. The method of manufacturing according to claim 10, further comprising:
   measuring a light coupling efficiency as a function of the one of longitudinal movement or rotational movement of the beam director.

18. The method of manufacturing according to claim 10, further comprising:
   bonding the optical system to the v-groove bench.

19. The method of manufacturing according to claim 18, wherein the bonding occurs after the redirected light is set on the surface plane of the grating coupler at an optimum light coupling efficiency.

20. An optical assembly for coupling a light signal to a grating coupler, the optical assembly comprising:
   a v-groove bench bonded to a substrate,
   a grating coupler disposed adjacent to the v-groove bench, and
   an optical system disposed on the v-groove bench, the optical system comprising:
      a laser source for generating a beam of light,
      a coupling lens system for receiving the beam of light from the laser source and guiding the beam of light in a first direction, and
      a beam redirector for redirecting the beam of light to a second direction, the second direction of redirected light being about 90° from the first direction,
         wherein the beam redirector comprises a cylindrical portion and a reflector portion that are bonded to one another,
         wherein the reflector portion is suspended beyond an edge of the v-groove bench,
         wherein the coupling lens system and the beam redirector are bonded to the v-groove bench,
         wherein the beam redirector sets a focal point of the redirected light onto a surface plane of the grating coupler, and
         wherein the beam redirector sets an angle of incidence between the second direction of the redirected light and a direction normal to the surface plane of the grating coupler.

21. The optical assembly of claim 20, wherein the reflector portion is a prism and the cylindrical portion is a glass.

22. The optical assembly of claim 20, wherein the reflector portion is positioned above the grating coupler.

23. The optical assembly of claim 20, wherein one of a half-wave plate or an isolator is attached to one of the beam redirector or the coupling lens system.

24. The optical assembly of claim 20, wherein the beam redirector is bonded in a position along the v-groove bench and in a rotational orientation that provides an optimum optical coupling of light emitted by the laser source into the grating coupler.

25. An optical assembly for coupling a light signal to a grating coupler, the optical assembly comprising:
   a v-groove bench bonded to a substrate,
   a grating coupler disposed adjacent to the v-groove bench, and
   an optical system disposed on the v-groove bench, the optical system comprising:
      a laser source for generating a beam of light,
      a coupling lens system for receiving the beam of light from the laser source and guiding the beam of light in a first direction, and
      a beam redirector for redirecting the beam of light to a second direction, the second direction of redirected light being about 90° from the first direction,
         wherein the beam redirector comprises a cylindrical portion and a reflector portion that are bonded to one another,
         wherein the reflector portion is a mirror and the cylindrical portion is a hollowed tube,
         wherein the coupling lens system and the beam redirector are bonded to the v-groove bench,
         wherein the beam redirector sets a focal point of the redirected light onto a surface plane of the grating coupler, and wherein the beam redirector sets an angle of incidence between the second direction of the redirected light and a direction normal to the surface plane of the grating coupler.

\* \* \* \* \*